__United States Patent__ [19]

Gandhi et al.

[11] 4,152,299

[45] May 1, 1979

[54] RUTHENIUM CATALYST SYSTEM AND METHOD OF STABILIZING A RUTHENIUM CATALYST SYSTEM

[75] Inventors: Haren S. Gandhi, Dearborn Heights; Mordecai Shelef, Southfield, both of Mich.

[73] Assignee: Ford Motor Company, Dearborn, Mich.

[21] Appl. No.: 895,195

[22] Filed: Apr. 10, 1978

Related U.S. Application Data

[63] Continuation-in-part of Ser. No. 775,812, Mar. 9, 1977, abandoned, which is a continuation-in-part of Ser. No. 652,913, Jan. 28, 1976, abandoned, which is a continuation of Ser. No. 505,119, Sep. 11, 1974, abandoned.

[51] Int. Cl.$^2$ .................. B01J 23/10; B01J 23/46; B01J 23/74
[52] U.S. Cl. .................. 252/462; 423/213.5
[58] Field of Search ............ 252/462; 423/213.5

[56] References Cited

U.S. PATENT DOCUMENTS

| | | | |
|---|---|---|---|
| 3,897,367 | 7/1975 | Lauder | 252/462 |
| 3,901,828 | 8/1975 | Mai et al. | 252/462 |
| 3,907,968 | 9/1975 | Kobylinski et al. | 423/213.5 |
| 3,972,837 | 8/1976 | Acres et al. | 252/473 |

*Primary Examiner*—W. J. Shine
*Attorney, Agent, or Firm*—William E. Johnson; Keith L. Zerschling

[57] ABSTRACT

Under oxidizing conditions, a ruthenium catalyst system which is not protected will lose ruthenium by volatilization. A method is taught in this specification for stabilizing a ruthenium catalyst system against such volatilization under oxidizing conditions. The method is carried out by applying to a catalyst substrate a ruthenium catalyst system in which the catalytic material under oxidizing conditions is of the type $La^{+3}Ni_x^{+3}Ru_{1-x}^{+3}O_3$ wherein x is in the range from 0.1 to 0.9.

4 Claims, No Drawings

RUTHENIUM CATALYST SYSTEM AND METHOD OF STABILIZING A RUTHENIUM CATALYST SYSTEM

This application is a continuation-in-part of our application Ser. No. 775,812, filed Mar. 9, 1977, now abandoned, which was a continuation-in-part of our application Ser. No. 652,913, filed Jan. 28, 1976, now abandoned, which, in turn, was a continuation of our application Ser. No. 505,119, filed Sept. 11, 1974, now abandoned, all of which applications were entitled "Method of Stabilizing a Ruthenium Catalyst System."

BACKGROUND OF THE INVENTION

Our U.S. Pat. No. 3,819,536 issued June 25, 1974 for "Process for Preparing a Catalyst Based on Ruthenium" and our U.S. Pat. No. 3,835,069 issued Sept. 10, 1974 for "Ruthenium Catalyst System" disclose ruthenium catalysts which are protected from volatilization under oxidizing conditions. These two patents teach stabilization of a ruthenium catalyst system by use of alkaline earth materials or rate earth materials in order to provide some protective agent for the ruthenium under oxidizing conditions. The patents teach two different methods of developing the stabilized ruthenium compound. The patents also teach that under reducing conditions, the catalyst become active in its role of eliminating oxides of nitrogen but under oxidizing conditions, the alkaline earth or rare earth materials do combine with the ruthenium to form compounds which are not generally volatilized.

The present application teaches a method of preparing a stabilized ruthenium catalyst system, no matter how the catalyst system is laid down on the catalyst substrate, which has a stability at extremely high space velocity (100,000 hours $^{-1}$ and higher) and at temperatures in excess of 750° C. The stabilized catalyst system may be applied to a substrate as described in either of the above-identified U.S. patents. The principal factor for achieving the higher stability of these catalysts comes from the substitution of a portion of the ruthenium of the catalyst system by a stable base metal oxide of a valence state which permits formation of a perosvskite type compound when the base metal oxide is present with a stabilizing metal oxide, ruthenium and oxygen.

SUMMARY OF THE INVENTION

This invention relates to a method of stabilizing a catalyst system and, more particularly, to a method of stabilizing a ruthenium catalyst system under oxidizing conditions at times when the catalyst system is exposed to both high space velocities and excessive temperatures.

In accordance with the teachings of this invention, a method of stabilizing a ruthenium catalyst system under oxidizing conditions comprises the general step of applying to a catalyst substrate a ruthenium catalyst system in which the catalytic material under oxidizing conditions is $La^{+3}Ni_x^{+3}Ru_{1-x}^{+3}O_3$ wherein x is in a range from 0.1 to 0.9.

The catalyst of this invention is intended to be used under reducing conditions to eliminate oxides of nitrogen from an exhaust gas stream developed in an internal combustion engine. However, under normal conditions, the exhaust gas stream developed by an internal combustion engine is not reducing in nature at all times and is oxidixing in nature for short periods of time. There are short increments of time in which the exhaust gases developed by an engine are oxidizing in nature in that there are more oxidation species present in a unit volume of gas than reducing species. When a ruthenium containing catalyst is subjected to an oxidizing environment, ruthenium, if left unprotected, will be oxidized to its highest valence state. This highest valence, oxide state of ruthenium is volatile under normal operating temperatures found in a catalytic converter.

The catalyst system proposed by us is one which has two different states. Under oxidizing conditions, the materials used on the catalyst substrate form the above-identified perovskite type compound for the purpose of protecting the ruthenium during oxidizing conditions. During these oxidizing conditions the perovskite formed is not intended to act as a catalyst for eliminating oxides of nitrogen from the exhaust gases. The ruthenium, however, is protected from volatilization via this mechanism of perovskite formation.

When the exhaust gas stream cycles back to a stream which is reducing in character, that is, there are more reducing species present than oxidizing species, the perovskite compound is reduced. One now has the individual component, namely ruthenium, of that previous perovskite compound available under reducing conditions to act as a catalyst for elimination of oxides of nitrogen.

Thus, the catalyst of our invention exists in two states depending on whether it is subjected to oxidizing or reducing conditions. Under oxidizing conditions the materials are in the form of a perovskite compound and are inactive in the reduction of oxides of nitrogen from the stream. Under reducing conditions, the perovskite compound is reduced to the individual elements and, thus, ruthenium is available to act as a catalyst for the reduction of oxides of nitrogen in a gas stream which is overall reducing in character. Thus, under oxidizing conditions the ruthenium is protected from volatilization so that it can be made available under reducing conditions as metallic ruthenium to act as a $NO_x$ catalyst.

DESCRIPTION OF THE PREFERRED EMBODIMENT

Our previously mentioned patents are directed to particular methods for preparing a ruthenium catalyst which is protected from volatilization under oxidizing conditions. The methods taught in these patents employ ruthenium and a protective stabilizing metal oxide selected from the group consisting of alkaline earth materials and rare earth materials. The stabilizing metal oxide is an effective way to stabilize ruthenium under normally encountered operating conditions for such a catalyst system. In particular, the stabilization is good for space velocities below about 80,000 hour $^{-1}$ and temperatures below about 800° C. Under some operating conditions, however, in excess of the stated temperatures and space velocities just described, some ruthenium may be lost even though stabilizing material is present under oxidizing conditions.

We have found that ruthenium may be stabilized in conjunction with such a stabilizing metal oxide to a greater extent if a portion of the ruthenium material is replaced by a stable base metal oxide of a valence state which permits formation of a perovskite type compound. Such stabilization is particularly noticeable at space velocities in excess of 80,000 hour $^{-1}$ and at temperatures in excess of 800° C. We have found that no matter in what manner the ruthenium catalyst system is prepared, as for example by either one of the methods taught in the above-described patents, the stability of the entire catalyst system is greatly increased at high space velocities and excessive temperatures if a stable base metal oxide is used to replace a portion of the ruthenium in the catalyst system.

In order to produce the perovskite type compound, one must correlate the valence state of the stable metal base oxide with the valence state of the ruthenium. For example, if the stable base metal oxide has a valence state of +3, the ruthenium in the perovskite compound must also have a valence state of +3. The valence state of +3 may be prepared by using equal molar portions of ruthenium dioxide and pure ruthenium metal in preparing the perovskite compound or by any other method which achieves a +3 valence state in the final compound. It should be understood, that the perovskite compound is believed to be present only under oxidizing conditions. Under reducing conditions, the perovskite type compound breaks down to produce elemental ruthenium which is an effective catalyst in decomposing oxides of nitrogen. If, however, the catalyst system is subjected to a period of an oxidizing ambient, the perovskite type material is reformed.

Thus, once again we desire to emphasize the fact that our catalyst is designed to eliminate oxides of nitrogen from an exhaust gas stream which is overall reducing in character. We achieve this reduction of oxides of nitrogen by use of ruthenium and we make the ruthenium available by reducing the perovskite compound which has been formed under oxidizing conditions. In its intended condition of use, the materials of the catalyst would be on a substrate as ruthenium metal, as a base metal and as a stabilizing metal. Under oxidizing conditions, however, these three previously individual elements react with oxygen and themselves to form the perovskite compound which locks up the ruthenium and thereby prohibits oxidation of the ruthenium to its volatile +4 valence state. In this manner, the ruthenium is protected when an occasional oxidizing environment comes along during operation of the catalyst. Again, the catalyst system is active as a catalyst under reducing conditions and is inactive under oxidizing conditions as a reduction catalyst. The ruthenium of the catalyst is, however, protected from volatilization under oxidizing conditions.

A particularly good ruthenium catalyst system based on the teachings of this invention is one in which the stable base metal oxide is nickel. Since nickel has a +3 valence state, the best individual catalyst formed for this system is $La^{+3}Ni_x^{+3}Ru_{1-x}^{+3}O_3$, wherein x is in a range from 0.1 to 0.9, preferably 0.5.

Preparation of $LaNi_{0.5}Ru_{0.5}O_3$ compound.

This compound is prepared by heating reagent grade $La_2O_3$, $RuO_2$ and $NiO$ in equal molar amounts in air at 1150° C. for 24 hours as described by Galasso and Darby in Organic Chemistry Vol. 4, No. 1, p. 71, 1965. The resultant material is a perovskite type compound. The compound had a BET surface area of about 0.68 square meters per gram. This compound is ground and sieved and a minus 44 micron fraction is used as a pre-synthesized catalyst. A monolith is coated with colloidal gamma alumina, a refractory oxide, so as to obtain a 10% by weight coating of gamma alumina on the substrate which acts as a surface extending material. The substrate is dired at 120° C. and calcined at 600° C. for six hours. The BET surface area of the substrate is 11 square meters per fram after depositing the washcoat. A slurry containing the finely ground, −4 mesh size $LaNi_{0.5}Ru_{0.5}O_3$ and a small amount of gamma alumina is applied to the high surface substrate so as to get 500 parts per million ruthenium as a ruthenate on the substrate. The catalyst substrate is dried at 110° C. and calcined at 600° C. for a few hours. The so produced substrate is found to be effective under reducing conditions in the conversion of oxides of nitrogen.

As described in U.S. Pat. No. 3,907,968, other refractory oxide materials may be used to increase the surface area of the substrate. Such refractory oxide materials are well known in the art and therefore no list of them will be made herein.

The above-described catalyst is a reduction catalyst under only reducing conditions in which the individual elements of lanthanum, nickel and ruthenium are present to effect a reduction of the oxides of nitrogen. When this system is presented with an overall oxidizing environment, the system reverts to the lanthanum nickel ruthenium perovskite structure in which the three elements react with one another and with oxygen. Thus, under reducing conditions the ruthenium is present as elemental ruthenium and is an effective catalyst for eliminating oxides of nitrogen.

As a test of the stability of the compound, several different compounds were tested at a flow rate of 300 cc. per minute of air at a temperature of 1100° C. with an initial weight of each catalyst material being 90 mg. Ruthenium dioxide was found to lose 20 mg. per hour under the experimental conditions whereas barium ruthenate loss was 0.4 mg. per hour and $LaRuO_3$ loss was 0.88 mg. per hour and $LaNi_{0.5}Ru_{0.5}O_3$ loss was 0 milligrams per hour.

Thus, the method of this invention is one which teaches the preparation of a ruthenate system which is protected by a stabilizing metal oxide as well as having a stable base metal oxide substituted for a portion of the ruthenium material. Those skilled in the art will upon reading this specification be directed to obvious modification thereof. It is intended that any such modification be included within the scope of the appended claims.

What we claim is:

1. A method of forming a ruthenium catalyst system which can provide ruthenium in its elemental state when exposed to a reducing environment and provide ruthenium in a stabilized state when exposed to oxidizing conditions, which method comprises:

obtaining a catalyst substrate;

applying to said catalyst substrate a refractory oxide material which acts as a surface area extending material;

preparing a perovskite compound of the formulation $La^{+3}Ni_x^{+3}Ru_{1-x}^{+3}O_3$ wherein x is in a range from 0.1 to 0.9;

grinding said perovskite into a finely divided state;

forming a slurry with said finely divided perovskite compound;

applying said slurry to said refractory oxide coated substrate; and calcining said substrate so that perovskite compound adheres thereto.

2. The method of claim 1 wherein: x is 0.5.

3. A catalyst system consisting of:

a substrate;

a refractory oxide material coated on said substrate in which said refractory oxide material acts as a surface area extending material on said substrate;

a perovskite compound of the structure $La^{+3}Ni_x^{+3}Ru_{1-x}^{+3}O_3$ on said refractory oxide coated substrate wherein x is in a range from 0.1 to 0.9.

4. The catalyst system as defined in claim 3 wherein: x is 0.5.

* * * * *